United States Patent [19]

Brightman et al.

[11] 4,451,703
[45] May 29, 1984

[54] ALL ELECTRONIC INTERFACE FOR TELEPHONY SYSTEM

[75] Inventors: Barrie Brightman; Frank Niertit, both of Casselberry, Fla.

[73] Assignee: Stromberg-Carlson Corporation, Lake Mary, Fla.

[21] Appl. No.: 335,648

[22] Filed: Dec. 30, 1981

[51] Int. Cl.³ .............................................. H04M 3/22
[52] U.S. Cl. .................................. 179/18 FA; 307/257
[58] Field of Search ........ 179/18 GF, 18 FA, 18 FC, 179/18 EB; 370/56; 340/825.96; 307/257, 115

[56] References Cited

U.S. PATENT DOCUMENTS

| 2,866,103 | 12/1958 | Blake et al. | 307/257 |
| 3,737,680 | 6/1973 | Uchida | 307/257 |
| 3,796,894 | 3/1974 | Marchetti et al. | 307/257 |
| 3,973,143 | 8/1976 | Embree et al. | 307/255 |

OTHER PUBLICATIONS

"High Voltage Crosspoint Device for Line Concentrator Mounted on the Ceramic Board with Crossover Capacitance", Yoshino et al., International Switching Symposium (Paris), May 7-11, 1979, pp. 660-666.
"Electronic Replacements for Relays", A. W. Sweet, Electrical Communication, vol. 54, No. 1, 1979, pp. 51-55.

Primary Examiner—Thomas W. Brown
Attorney, Agent, or Firm—Cesari and McKenna

[57] ABSTRACT

A line circuit for connecting a subscriber line to a telephony system that avoids the use of electro-mechanical elements such as relays. A bridge circuit includes a bilateral current gate in each of the tip and ring lines that can couple or inhibit signals from passing between the subscribed lines and the system. When the bilateral current gates are in an inhibit mode, an on-hook current source energizes the tip and ring lines. A detector senses when the subscriber goes off-hook, and also the dial pulses. After the current gate goes into a coupling mode, the on-hook current source and detector are electrically inactive, and an off-hook current source thereafter provides current to the tip and ring conductors.

13 Claims, 8 Drawing Figures

ON HOOK LINE CURRENT SWITCH 40

FIG. 4

OFF HOOK AND DIAL PULSE
DETECTOR 50

FIG.5

BRIDGE DISCONNECT 60

FIG.6
OFF HOOK LINE FEED CURRENT 70

ALL ELECTRONIC INTERFACE FOR TELEPHONY SYSTEM

CROSS REFERENCE TO RELATED APPLICATIONS

U.S. patent application Ser. No. 335,649, for a Bilateral Electronic Switch, filed by Barrie Brightman, Frank Niertit, and Joseph A. Hartman on an even date herewith and assigned to the same assignee as this application; and U.S. patent application Ser. No. 335,593, for a Concentrator Circuit, filed by Barrie Brightman and Frank Niertit on an even date herewith and assigned to the same assignee as this application.

BACKGROUND OF THE INVENTION

This invention generally relates to telephony systems and, more particularly, to the interfacing circuitry between a central switch and individual subscriber tip and ring, or analogous, conductors.

Conventional telephony switching systems take a variety of forms, but generally contain certain basic elements. For example, U.S. patent application Ser. No. 395,178, filed July 6, 1982, discloses a telephone switch in which the major switching is performed by a call control processor subsystem that interacts with a matrix network and a port event processor. The matrix network receives signals from and transmits signals to various port group units in digital form over time division multiplexed highways.

Each port group contains supervisory circuitry for sensing various conditions on individual sets of subscriber lines and for receiving control signals from the port event processor for establishing an operating environment. Each port group unit additionally includes circuitry for interfacing signals on the physical lines emanating from the central switch and other circuitry in the port group unit. That circuitry is called a line circuit and, in certain telephony systems, there is one line circuit for each subscriber line. In other circuits, a concentrator circuit may couple a number of subscriber lines to a fewer number of line circuits in order to share the line circuitry and reduce costs.

Both the line circuits and concentrators of the prior art have included electromechanical relays. For example, in a typical line circuit the tip and ring conductors connect through a hybrid transformer to a coder-decoder, or codec, circuit that provides analog-to-digital and digital-to-analog conversion. The tip and ring conductors also energize a line inductor and a CB relay that senses the hook signal represented by the current flowing in a DC loop. The CB relay controls a pair of CB contacts that connect to a power supply to produce a supervisory signal indicating hook switch status.

A typical line circuit also includes a ringing relay that responds to control signals from the central switch to superimpose ringing signals onto the tip and ring conductors. If certain testing operations are permitted, a test access relay may also be included. The test access relay effectively disconnects the line circuit from the tip and ring conductors in order to perform test calls through the line circuit and remaining elements in the telephony system.

Call concentration may also be achieved. If 40 sets of tip and ring conductors are interconnected to ten line circuits, a four to one concentration is achieved. A specific level of concentration will depend upon the nature of a particular application and specifically the calling rates of the individual subscribers. In the prior art, however, these concentrators also include a number of electromechanical relays that are arranged in matrices to selectively couple a selected set of tip and ring conductors to a corresponding line circuit. Thus, in the foregoing example, four such concentrators might interconnect four corresponding line circuits to 20 sets of tip and ring conductors and two sets of concentrators might interconnect all 40 lines to two separate line circuits, thereby to utilize ten line circuits in connection with the 40 sets of tip and ring conductors.

The switching elements that constitute the electromechanical relays in the line circuits and the concentrators must comprise bilateral, wide-band, low-loss, low-distortion switching elements. With electromechanical relays, the closure of the contacts on the relays provides a metal-to-metal connection that forms a conductive path. The path produces essentially no loss of, and no distortion to, any signal passing through the contacts. This connection allows bilateral signal transmission over a wide range of frequencies. The contacts can withstand voltage and current levels that are dependent only upon the rating of the contacts themselves. The relays also provide lightning and other transient signal protection to control circuits, because the air gap between the contacts and the coil inherently isolates transient signals on the conductive path from the control circuitry that connects to the coil.

Unfortunately, such electromechanical devices have a number of known characteristics that are detrimental in many applications including telephony applications. Life expectancy of a relay depends upon contact wear. As contact wear is not predictable on a accurate basis, it is difficult to predict relay life. Moreover, electromechanical relays tend to be expensive, and this expense is subject to high cost multiples in line circuits and concentrators for telephone switching networks. In concentrators, one such relay is used for each of the many telephone lines that connects to a single concentrator and the telephone switching network may include many concentrators. Likewise, each line circuit may contain multiple relays and there may be one line circuit for each telephone line. Electromechanical relays also increase other manufacturing costs as they are discrete elements that must be mounted on circuit boards individually.

Special switching circuits have been proposed from time to time to replace the electromechanical relay. Reversely poled, silicon-controlled rectifiers, and other transistor circuits have been suggested. However, in telephone applications both DC hook signals and analog voice signals pass through such switching circuits in both concentrators and line circuits. The reversely poled, transistor and SCR circuits introduce a crossover distortion as these circuits tend to stop conducting near the zero voltage, or current crossover, point. Circuitry can be added to compensate such distortion. However, this and other circuitry that may be necessary to provide proper operation increase the overall cost of the manufacture of the concentrator or line circuit.

More recently, a gated diode switch has been proposed that can be manufactured with large scale integration manufacturing techniques. The large number of switches in concentrators and line circuits makes the use of large scale integration manufacturing techniques highly desirable, especially in view of the attendant cost savings that can be achieved. The proposed switch, however, has certain disadvantages. First, the circuit requires a floating power supply. When the switch is located in the standard tip and ring conductors to or from a subscriber's handset, certain precautions must be taken to protect customers and telephone company personnel against inadvertent contact with these voltages. This switching circuit also requires three separate voltages and this, of course, introduces complexities in the power supplies that serve the telephony switching network. Moreover, it would appear from available information that the proposed switch may require compensation for crossover distortion when the switching circuit conveys analog voice signals.

SUMMARY OF THE INVENTION

Therefore, it is an object of this invention to provide an interface circuit that interconnects tip and ring conductors from a subscriber's telephone line and a central switch and that is free of electromechanical relays.

Another object of this invention is to provide an interface between subscriber conductors and a telephone switch that provides signal concentration that is free of electromechanical relays.

Yet another object of this invention is to provide an interface between a subscriber's telephone conductors and a telephone switch that includes a line circuit that is free of electromechanical relays.

Yet still another object of this invention is to provide circuitry for use in a telephone switching network that signals hook switch status and dial pulses and that is free of electromechanical relays.

Yet still another object of this invention is to provide circuitry and an interface between subscriber telephone lines and a telephone switch that provides ringing signals and that is free of electromechanical relays.

Yet still another object of this invention is to provide interfacing circuitry between subscriber telephone lines and a telephone switch that is adapted for large scale integration manufacture.

In accordance with this invention, the interfacing circuitry between a telephone switch and subscriber telephone lines comprises a solid state, bilateral current gate circuit in place of electromechanical relays. Generally, the bilateral current gate includes a plurality of diodes connected to provide input and output junctions that define parallel, unidirectional current paths including the diodes and balance point junctions that connect to terminals between which the telephone signals are to pass. Other circuitry produces a bias current to forward-bias the diodes and enable the transfer of signals between the balance point junctions without any significant signal attenuation and without signal distortion.

This invention is pointed out with particularity in the appended claims. The above and further objects and advantages of this invention may be better understood by referring to the following description taken in conjunction with the accompanying drawings.

DESCRIPTION OF ILLUSTRATIVE EMBODIMENTS

Figure 1:
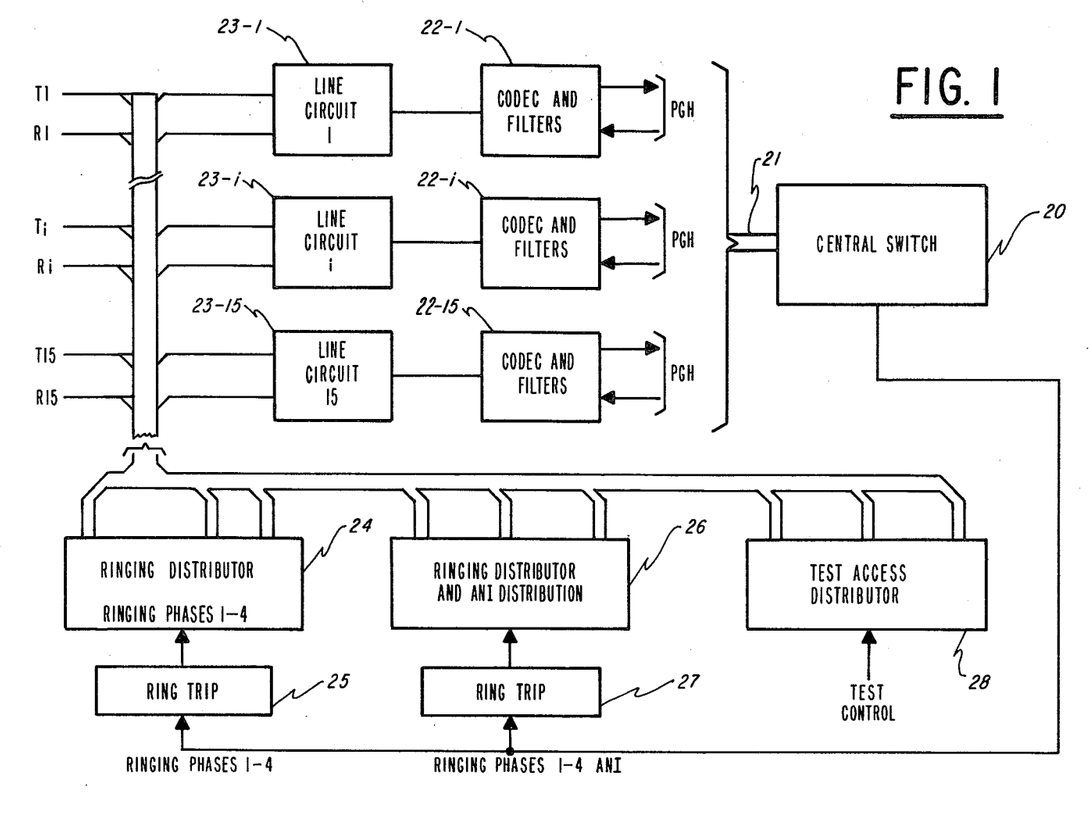
FIG. 1 is a block diagram of portions of a telephone switching circuit that incorporate this invention.

FIG. 1 depicts a central switch 20 that controls switching among a number of subscriber sets in a telephone switching network. The network is represented by three sets of Tip and Ring conductors T1,R1, and Ti,Ri and T15,R15. The central switch 20 communicates with each of these Tip and Ring conductors through port group highways 21 that connect to circuitry associated with each Tip and Ring conductor. In FIG. 1 there is shown, by way of example, a coder-decoder, or CODEC, and filter circuit 22-1 and a line circuit 23-1 that are associated with the T1,R1 conductors. CODEC and filter circuit 22-i and line circuit 23-i are associated with the Ti,Ri conductors, while CODEC and filter circuit 22-15 and line circuit 23-15 are associated with the T15,R15 conductors.

In one particular embodiment, the fifteen line circuits are controlled by and grouped with a ringing distributor circuit 24, a ringing distributor and ANI (Alternate Number Identification) distribution circuit 25, and a test access distributor 26. Each of these circuits operate under the control of the central switch 20. More particularly, the ringing phase signals and ANI signals are applied to the distributor circuits 24 and 25 which, in turn, are connected to the different Tip and Ring conductors, thereby to provide ringing and ANI test signals to a selected set of Tip and Ring conductors. The test access distributor 26 is utilized during a test call procedure to disconnect a selected set of the Tip and Ring conductors from its corresponding line circuit for performing test calls for maintenance and diagnostic purposes.

Figure 2:
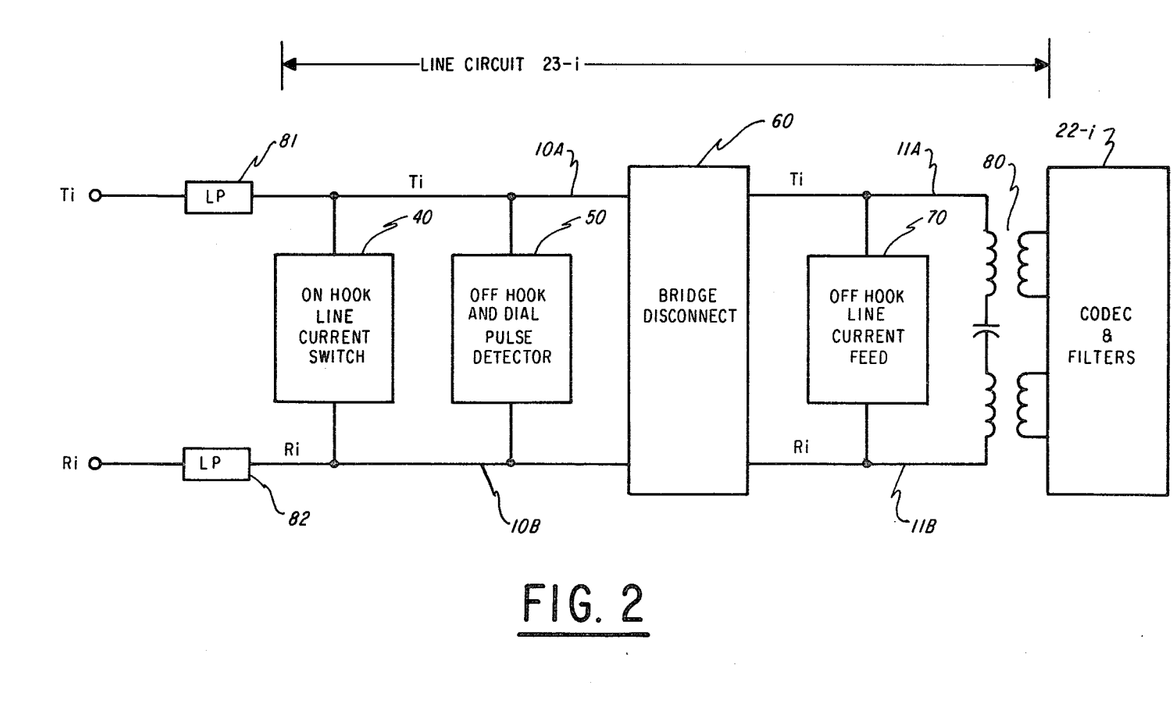
FIG. 2 is a block diagram of a line circuit that is utilized in the switching circuit of FIG. 1.

Each of the line circuits 23-1 through 23-15 is constructed, in one embodiment, according to the circuitry shown in FIG. 2. FIG. 2 shows line circuit 23-i and its interconnection with the CODEC and filter circuit 22-i.

An on-hook line current switch 40 energizes the Tip and Ring conductors while the subscriber's telephone is on hook. This enables changes in the hook switch caused by either changes in the hook status or by dialing pulses to be monitored in an off hook and dial pulse detector circuit 50. This circuit performs the function of a conventional line relay. A bridge disconnect circuit 60 interconnects the conductors 10A and 10B with the conductors 11A and 11B, respectively, and performs the functions of the CB relay found in conventional line circuits. An off-hook line current feed circuit 70 energizes the Tip and Ring conductors while the subscriber's telephone is off hook and allows AC signals to energize a hybrid transformer 80 while acting as a dc current bypass for the hybrid transformer 80. This minimizes the size of the transformer 80. The hybrid transformer 80 then connects to the CODEC and filter circuit 22-i.

The line circuit 23-i connects to the subscriber lines through lightning protection circuits 81 and 82. These circuits provide secondary lightning protection and limit the maximum excursions of the signals on the conductors 10A and 10B.

As will become evident from the subsequent detailed description of the various circuits shown in FIG. 2, all electromechanical relays have been eliminated in the line circuits. They are replaced by a bilateral current gate network that operates in the balanced lines provided by the Tip and Ring conductors. Before describing a specific implementation of such a bilateral current gate and any particular location within the line circuit, it will be helpful to describe generally a bilateral current gate that is adapted for operation in balanced lines.

Generally, the line circuit operates in either an "on-hook" state or an "off-hook" state. The bridge disconnect circuit 60 constitutes an open circuit when the subscriber's handset is on-hook. During this state, the on-hook line current switch 40 supplies current to the Tip and Ring conductors, thereby to keep them in a charged state by overcoming the natural leakage impedences of the lines. When the off hook and dial pulse detector 50 senses the off-hook condition, it disables the on-hook line current switch 40 while simultaneously conditioning the bridge disconnect circuit 60 to shift the bilateral current gates into their conducting state. This connects the Tip and Ring conductors from the subscriber's handset to the transformer 80 and enables an off-hook line current feed circuit 70 to energize the subscriber's lines and serve as the source of signal current for the transformer 80.

Figure 3:
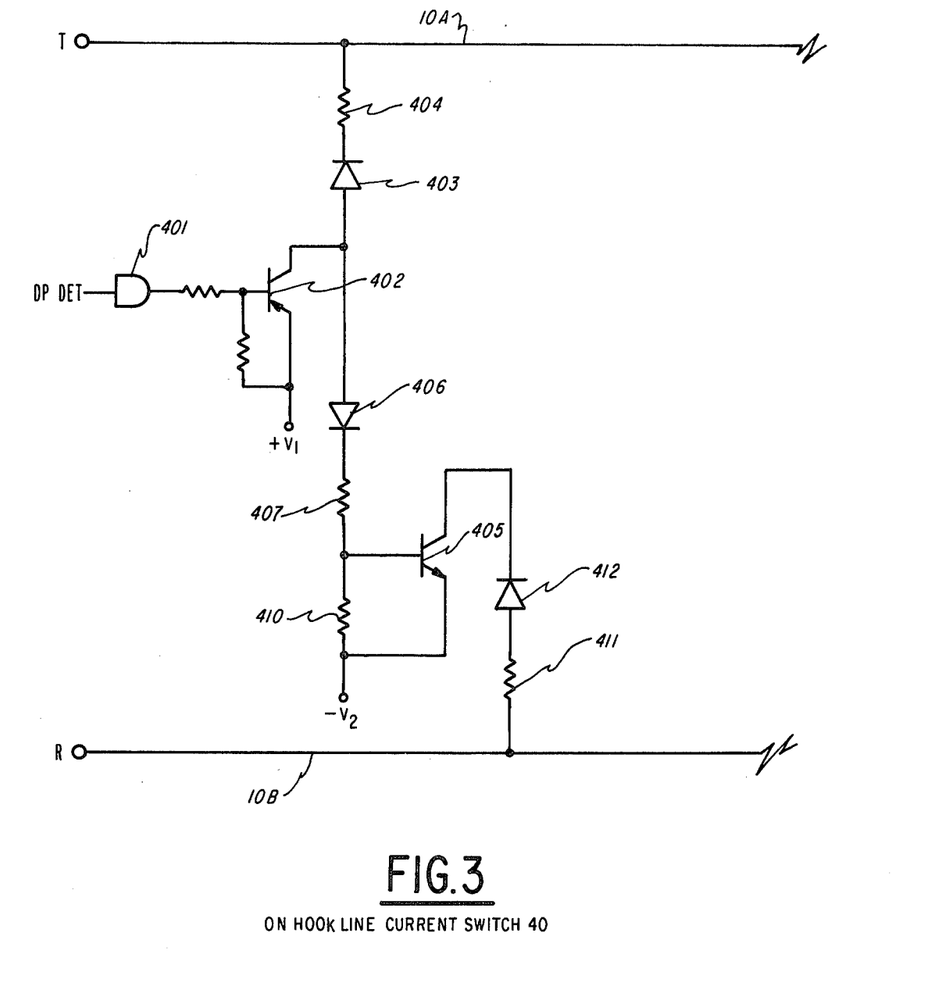
FIG. 3 is a detailed circuit diagram of an on hook line current switch useful in the line circuit of FIG. 2.

Now referring to FIG. 3, when the subscriber's handset is on-hook, a DP DET signal is in a nonasserted condition. This enables a buffer circuit 401 to drive a PNP transistor 402 into conduction. In one particular embodiment, the emitter of the PNP transistor 402 is connected to a positive power supply ($+V1$) of about five volts, which, in a normal telephone system that utilizes a $-48$ v battery voltage ($-V2$), represents substantially a ground potential.

When the PNP transistor 402 conducts, a diode 403 and resistor 404 connected to the Tip conductor 10A conduct and clamp the Tip conductor at a slightly positive voltage level. However, it can be considered that the Tip conductor 10A is grounded.

Other circuitry, including an NPN transistor 405, also conducts when the PNP transistor 402 conducts. A bias circuit comprising diode 406 and resistors 407 and 410 in series with the battery voltage ($-V2$) drives the NPN transistor 405 into conduction. A collector circuit, connected to the Ring conductor 10B, comprises resistor 411 and diode 412 in series. This circuit clamps the Ring conductor 10B to approximately the battery voltage ($-V2$). With these two voltages impressed on the Tip and Ring conductors 10A and 10B and the hook switch in the on-hook, or nonconducting, position, the on-hook line current switch 40 charges the Tip and Ring conductors with a current that is limited by the values of the resistors 404 and 411. Moreover, the switch 40 constitutes a balanced load on the Tip and Ring conductors.

The off-hook and dial pulse detector 50 senses the off-hook condition and is described below with respect to FIG. 4. When it asserts the DP DET signal, the buffer circuit 401 of the on-hook line current switch 40 (FIG. 3) reverse-biases the base-emitter junction in the PNP transistor 402. The transistor 402 then stops conducting and the transistor 405 is also reverse-biased. Thus, the on-hook line current switch 40 is effectively removed from the circuit as a source of line current. It is replaced by the off-hook line current feed circuit 70, as described later.

Transitions between the on-hook and off-hook condition of the subscriber's handset are detected as changes in line current level. The circuitry for detecting this condition is the off-hook and dial pulse detector 50 shown in FIG. 4. This circuitry includes a balanced resistive bridge network. Resistors 501 and 502 are in series between the Tip conductor 10A and the noninverting input of an operational amplifier 503. The junction of the resistors 501 and 502 is coupled to the negative battery voltage ($-V2$) through a resistor 504. This voltage is also substantially the voltage that is impressed on the Ring conductor 10B by the on-hook line current switch 40. The junction of the resistors 501 and 502 is also coupled to the positive power supply voltage ($+V1$) through a resistor 506 and to ground through a parallel capacitor 507.

Another portion of the resistive bridge comprises resistors 510 and 511 in series between the Ring conductor 10B and the inverting input of the operational amplifier 503. The bridge is completed by a resistor 512 to the $+V1$ power supply and a capacitor 513 to ground. Both the capacitor 507 and resistor 506 and the capacitor 513 and resistor 512 constitute high pass filters that bypass high frequency noise to ground, thereby to reject noise and render the off-hook dial pulse detector 50 relatively immune to noise on the lines.

A capacitor 514 between the inputs of the operational amplifier 503 bypasses any AC signals. A positive feedback resistor 515 provides some hysteresis, thereby tending to prevent improper shifts of the DP DET signal from the operational amplifier 503. A negative feedback capacitor 516 provides further high frequency noise immunity.

When the subscriber's handset is on-hook, the on-hook line current switch 40 in FIG. 3 places the Tip conductor 10A at substantially ground potential and the Ring conductor 10B at the negative battery potential. With the resistor 504 also being connected to the negative battery potential, the operational amplifier 503 is biased so that the DP DET signal is at a low level. However, when the hook switch shifts to a conductive state, indicating that the subscriber has gone off-hook, the potential difference between the conductors 10A and 10B is reduced and the operational amplifier 503 drives the DP DET signal to a positive level.

The resistive bridge network provides immunity to ripple that can be induced on the lines coupled between the central switch and the subscriber's handset. These signals tend to appear on both the Tip and Ring conductors in phase. Thus, their presence does not alter the difference between their respective signal levels on the Tip and Ring conductors 10A and 10B and so does not affect the output of the operational amplifier 503.

Figure 4:
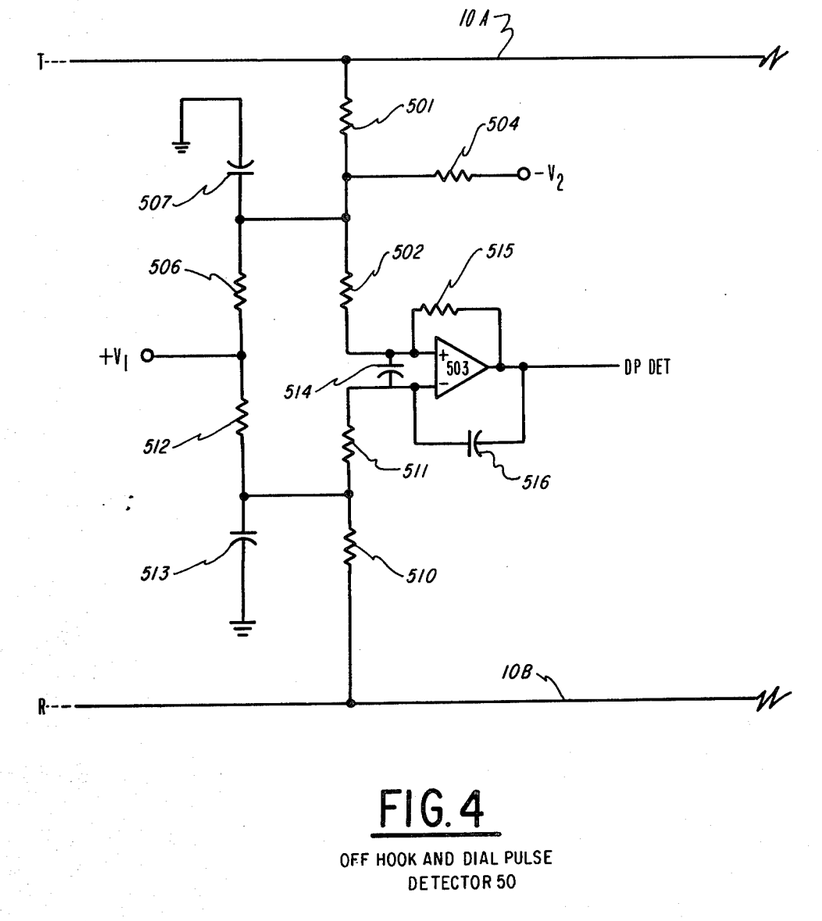
FIG. 4 is a detailed circuit diagram of an on/off hook and dial pulse detector useful in the line circuit of FIG. 2.

It will also be apparent that during normal rotary dialing operations, the circuit in FIG. 4 also will detect dial pulses and provide the dial pulse signalling necessary for encoding the appropriate supervisory information required by the central switch.

As previously indicated, the shift of the DP DET signal from a ground level to a positive level back-biases the transistor 402 in FIG. 3 and turns off the on-hook line current switch 40. This shift also causes the bridge disconnect circuit 60 to shift to a conductive state to couple signals to the central switch. The bridge disconnect circuit depicted in FIG. 5 incorporates a variation of the bilateral gate circuit depicted in the above-noted application Ser. No. 06/335,649, which application is incorporated herein by reference. Thus, in this bridge disconnect circuit the Tip conductor 10A connects to the Tip conductor 11A through a bilateral current gate 112A. A rectifier 130A, energized by signals from the secondary 127SA, forward biases the bilateral current gate 112A to provide a low loss, low distortion connection between the conductors 10A and 11A. Likewise, signals on the transformer 127 will energize the secondary 127SB and rectifier 130B, thereby to forward bias diodes in the bilateral current gate 112B, whose balance point junctions connect to the Ring conductors 10B and 11B.

Figure 5:
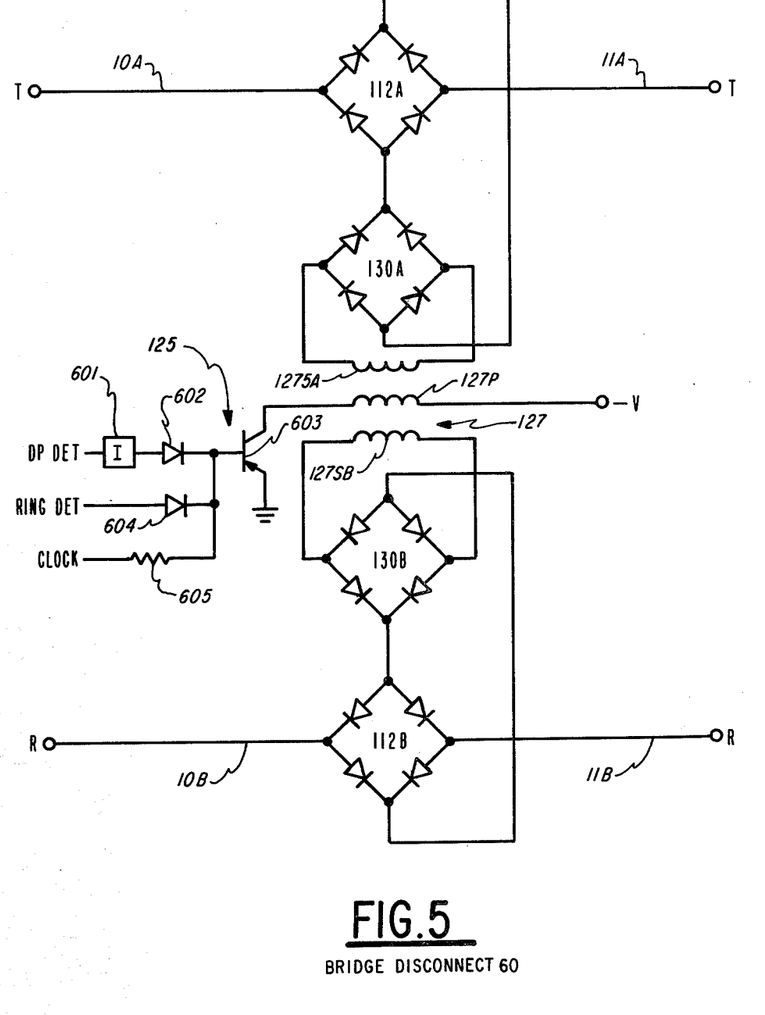
FIG. 5 is a detailed circuit diagram of a bridge disconnect circuit that is useful in the line circuit shown in FIG. 2.

Shifts between the conductive and nonconductive states are under the control of a switching network 125. The DP DET signal from the off-hook and dial pulse detector 50 is coupled to this switching circuit. Specifically, an inverter 601 and diode 602 connect in series to the base of a PNP transistor 603 that is in circuit between ground and the primary 127P of the transformer 127 to a negative power supply. A second input to the switch 125 to a RING DET signal from supervisory equipment that indicates ringing has been detected. This signal is coupled through a diode 604 to the base of the transistor 603. The remaining signal is a high frequency CLOCK signal that can be derived from any of a number of the clocking signals that are available within a central switch through a resistor 605 to the base of the transistor 603. When the DP DET signal is not asserted, the inverter 601 forward biases the diode 602 and the resulting signal shifts the transistor 603 to a blocking mode. As a result, no signal can pass through the transformer 127 and the bilateral current gates 112A and 112B are both maintained in a nonconductive state. When the DP DET signal shifts to an asserted level and the RING DETECT signal is not asserted, the clocking pulses are coupled to the base of the transistor 603. This energizes the transformer 127 and causes the rectifiers 130A and 130B to forward bias the diodes in the bilateral current gates 112A and 112B, respectively. Thus, the subscriber's handset is coupled to the hybrid transformer shown in FIG. 2. If ringing is detected, then the circuit 60 is blocked and disconnection occurs.

As previously indicated, assertion of the DP DET signal isolates the on-hook line feed circuit 40 from the Tip and Ring conductors. However, when the bridge disconnect circuit 60, shown in FIG. 5, shifts to a conductive state, the lines are energized by the off-hook line feed circuit 70, shown in FIG. 6. This circuit connects to the conductors 11A and 11B from the bridge disconnect circuit 60 to the hybrid transformer 80.

Figure 6:
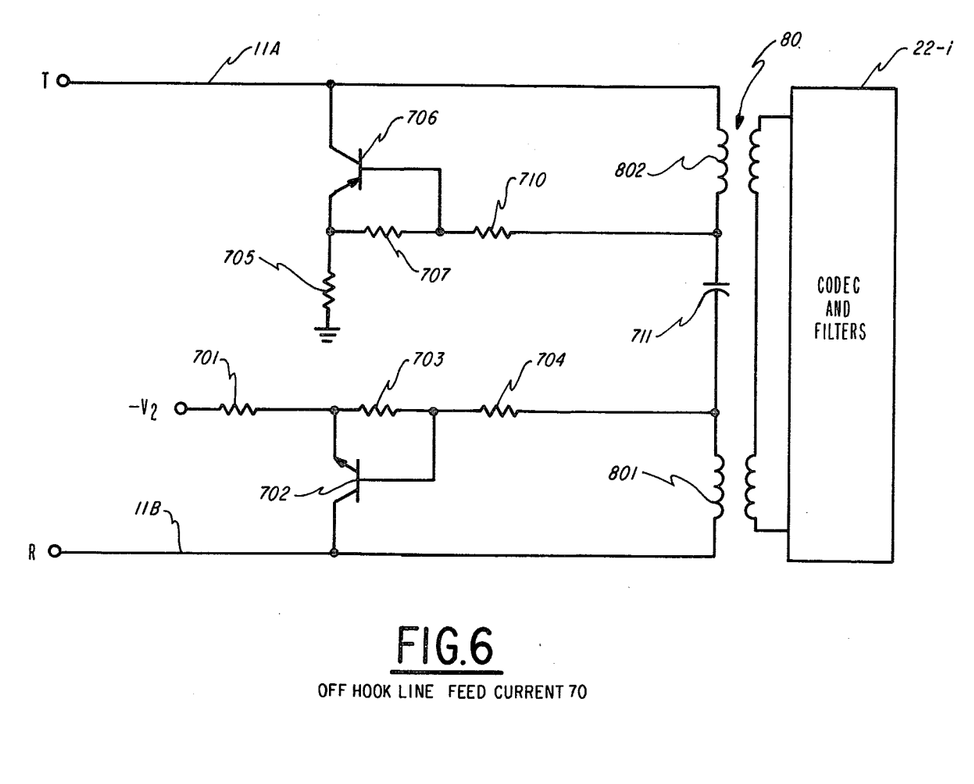
FIG. 6 is a detailed circuit diagram of an off hook line current feed circuit that is useful in the line circuit shown in FIG. 2.

More specifically, the negative battery voltage (−V2) is coupled through a current limiting resistor 701 and an NPN transistor 702 to the Ring conductor 11B. The transistor 702 is maintained in conduction by a base-emitter resistor 703 and a second resistor 704 that couples the base to a winding 801 associated with the hybrid transformer 80. A current path is established by a emitter resistor 705 and a PNP transistor 706 to the Tip conductor 11A. A base-emitter resistor 707 provides the appropriate bias and a base resistor 710 provides a base-collector bias across and parallel with the winding 802 of the hybrid transformer 80. An AC coupling capacitor 711 provides a low impedance AC path between the coils 801 and 802.

During the voice modulation of the signal, the current levels in the conductors 11A and 11B vary. However, the bias maintains the transistors 702 and 706 in a nonsaturated condition under normally expected loads. Thus, the transistors 706 and 702 constitute high AC impedance paths in parallel with the relatively low AC impedance path comprising windings 801 and 802 and capacitor 711. Thus, the off-hook line feed circuit introduces substantially no AC signal attenuation to the signal that is transferred across the hybrid transformer to the CODEC and filters 22-i. However, resistor 701, transistor 702, resistor 705 and transistor 706 provide a current path having low impedance to DC. Thus, the DC current essentially bypasses the coils 801 and 802. This reduces the requirements for coil size and allows miniaturization of the hybrid transformer 80. Moreover, the induced voltages on the lines tend to be nullified in this circuit by its balanced nature.

To summarize, when a subscriber's phone is on hook the on-hook line current switch 40 constitutes a high impedance power source for charging the Tip and Ring conductors 10A and 10B. The off-hook and dial pulse detector 150 senses changes in the line current caused by closure of the hook switch when the subscriber goes off hook. If a subscriber is originating a call and goes off hook, the off-hook and dial pulse detector disconnects the on-hook line current switch 40 and closes the bilateral current gates in the bridge disconnect circuit 60, thereby providing a path between the subscriber's handset and the hybrid transformer 80. Simultaneously, the bridge disconnect circuit 60 enables the off-hook line current circuit 70 to energize the Tip and Ring conductors 10A and 10B.

In addition, a signal from the off-hook and dial pulse detector 50 is used for providing supervisory informating concerning hook switch status and to reflect the operation of a rotary dialing operation in a conventional manner. Moreover, once the telephone call has been placed, AC signals modulate the line current and pass through the hybrid transformer 80 with minimal attenuation produced either by the bridge disconnect circuit 60 or the off-hook line current feed circuit 70. Likewise, during any ringing operations, the ringing signal will cause the bridge disconnect circuit 60 to disconnect, thereby isolating the hybrid transformer 80 without reconnecting the on-hook line current switch 40.

Similarly, at a terminating phone the incoming ringing signals cause the ringing distribution circuits 24 and 26 to couple appropriate timing signals onto the conductors. They also shift the bridge disconnect circuit 60 into a nonconducting mode, thereby isolating the hybrid transformer 80. When the subscriber answers, then either a ring trip detector of the same construction as the off-hook and dial pulse detector 50 or the off-hook and dial pulse detector 50 produces a signal which causes the bridge disconnect circuit 60 to shift to a conductive mode to complete the call.

When a subscriber releases a call by hanging up, the off-hook and dial pulse detector 50 senses the shift of the hook status signal to the on-hook condition or level and shifts the bridge disconnect circuit 60 to a nonconducting state and reconnects the on-hook line current switch 40 to the Tip and Ring conductors 10A and 10B.

Figure 7:
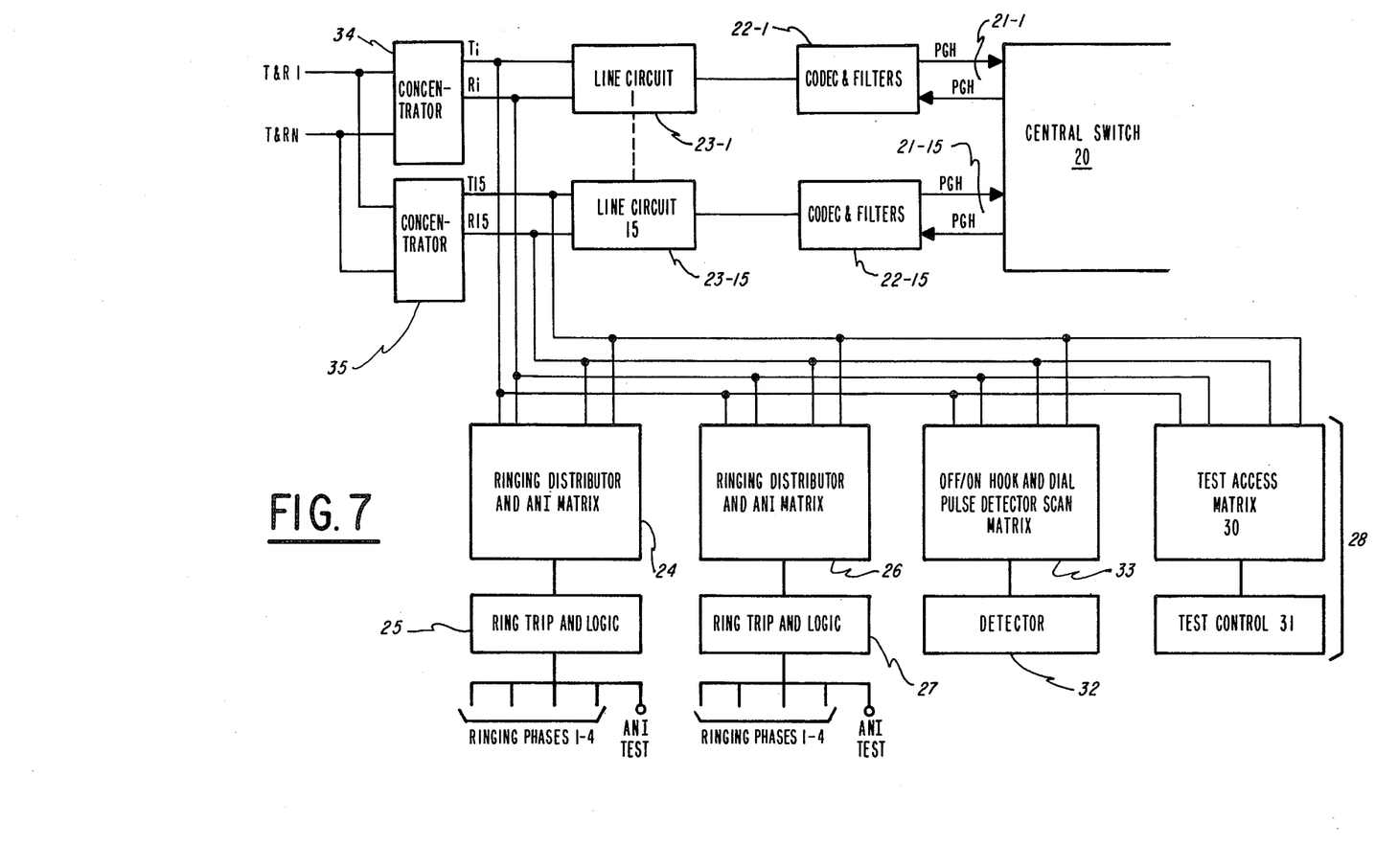
FIG. 7 is a circuit diagram of an alternative embodiment of a telephony switching circuit.

FIG. 7 depicts another embodiment of a central switch that can utilize line circuitry that incorporates the features of this invention. In this particular embodiment, a central switch 20 connects through port group highways 21, CODEC and filter circuits 22, and line circuits 23-1 to 23-15 to Tip and Ring conductors that are then connected to subscriber lines through concentrators. Using like numerals to identify elements that are analogous to elements in other figures, FIG. 7 depicts a group of 15 line circuits 23-1 through 23-15 and their associated CODEC and filter circuits 22-1 through 22-15 and port group highways 21-1 and 21-15. In this particular embodiment, groups of 15 line circuits, such as line circuits 23-1 through 23-15, are associated with a single set of control circuitry. This includes the ringing distributor and ANI matrices 24 and 26 and ring trip and logic circuits 25 and 27 that correspond to elements in FIG. 2. A test control circuit 28 comprises a test access matrix 30 and a test control circuit 31. Moreover, in this embodiment a single off-hook and dial pulse detector 32 monitors all the signals that are input to the line circuits 23-1 through 23-15 on a time division multiplexed basis. Time division multiplexing is provided by an off-hook and dial pulse detector scan matrix 33.

There is also shown in FIG. 7 two concentrators 34 and 35. Each of these concentrators connect to a number of subscriber lines depending upon the level of concentration that is desired. Two particular lines, T&R1 and T&RN are shown in FIG. 7.

Figure 8:
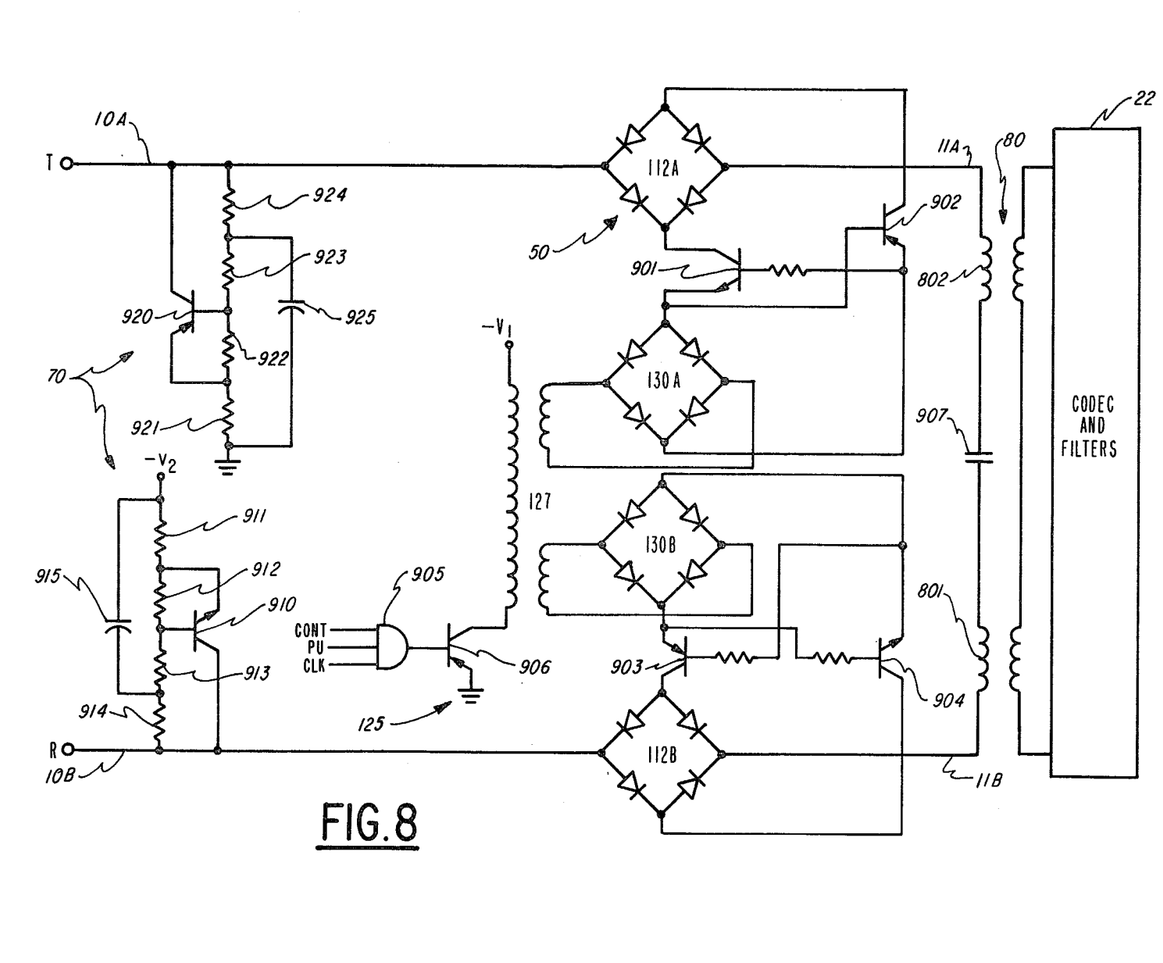
FIG. 8 is a detailed circuit diagram of a line circuit that is useful in the switching circuit shown in FIG. 7.

Now referring to FIG. 8, a typical line circuit is disposed between a concentrator and the corresponding CODEC and filter circuit 22. In this particular embodiment, a hybrid transformer 80 couples AC signals to the CODEC and filter circuit 22.

Signals are coupled from the output of a concentrator 34 or 35 through the corresponding line circuit 23 by a bridge disconnect circuit 60 that is somewhat different from the embodiment of FIG. 5. Referring to the circuitry associated with the Tip conductor 10A, the bilateral current gate 112A is driven into a conducting state when a switching signal energizes the transformer 127 thereby to energize the rectifier 130A. Cross-coupled transistors 901 and 902 interconnect the rectifier 130A and the bilateral current gate 112A. Thus, any time the rectifier 130A is energized the transistors 901 and 902 are driven into conduction and the bilateral current gate 112A conducts. Similarly, cross-coupled transistors 903 and 904 interconnect the rectifier 130B and the second bilateral gate 112B that is disposed in circuit with the ring line 10B. Energization of the transformer 127 thereby causes the rectifier 130B to drive the transistors 903 and 904 into conduction and forward bias the diodes in the bilateral current gate 112B.

The switching circuit 125 that provides the signals for the transformer 127 includes a control element in the form of an AND gate 905 and a switching transistor 906 in circuit with the primary of the transformer 127. The AND gate 905 receives a clocking (CLK) signal. When the circuitry is energized, a power up (PU) signal is applied to the AND gate 905. During operation, a control (CONT) signal determines whether the bilateral current gates 112A and 112B are opened or closed. When the CONT signal is asserted, it enables the CLK signals to alternately energize and deenergize the AND gate 905. The switching transistor 906 then impresses a square wave signal onto the transformer 127 so paths are established between the conductors 10A and 11B and the conductors 10B and 11B. The AC path is provided through the hybrid transformer 80 by a capacitor 907. When the CONT signal shifts to a nonasserted level, the AND gate 905 blocks conduction through the transistor 906.

A feed circuit provides power onto the lines and it corresponds in form to the off-hook line feed circuit 70 shown in FIG. 6. More specifically, the Ring conductor is coupled to the negative battery through an NPN transistor 910 and resistor 911. Resistors 912, 913, and 914 provides bias, and a capacitor 915 provides an AC bypass. Similarly, the Tip conductor 10A connects to the ground potential through a PNP transistor 920 and a resistor 921 in the emitter circuit. Resistors 922, 923, and 924 bias the transistor 920, and a capacitor 925 provides an AC path.

The circuit shown in FIG. 7, with the line circuit shown in FIG. 8, thereby provides a circuit which can connect, in appropriate applications, in telephone systems with certain advantages over the circuitry shown in FIGS. 1 and 2. Specifically, the line circuits contain fewer components. Power consumption is reduced. A larger packaging density is provided. All these characteristics provide a lower cost line circuit network, especially when that cost is measured on a per subscriber set basis.

There has been described in accordance with this invention a telephony switching system in which the line circuit and concentrator functions are provided by circuits that are free of electromechanical relays. Several embodiments of the circuits have been shown. However, each of the line circuits and concentrators is characterized by including a bilateral current gate that includes a number of diodes and that acts as a switch in response to a controllably switchable floating bias circuit which, with selection switching means, enables the bias current to drive the diodes in the bilateral current gate into a forward-conducting mode over a range of input signals to be transferred. Moreover, the circuitry that has been described is of the type which minimizes induced voltages on the line from adversely affecting the operation of the circuitry. Thus, while this invention has been described in terms of specific circuits, it will be apparent that various modifications can be made while still utilizing the basic concepts of this invention and attaining some or all of the advantages. Therefore, it is the intent of the appended claims to cover all such modifications as come within the true spirit and scope of this invention.

What is claimed as new and desired to be secured by Letters Patent of the United States is:

1. A line circuit for interconnecting a subscriber line having a far end connected to a subscriber set and a switching system and for coupling intelligence signals, including voice signals, therebetween in a telephony system, the subscriber line including both tip and ring conductors, the line circuit comprising:

A. connection means including:
  i. tip and ring bilateral current gate means connected to said tip and ring conductors respectively for selectively coupling intelligence signals therethrough, each of said tip and ring bilateral current gate means including a plurality of diodes connected to form (a) input and output junctions that define a unidirectional current path through said bilateral current gate means and (b) balance point junctions that connect in the path of the intelligence signals; and
  ii. bias current means connected to the switching system and the tip and ring bilateral current gate means for providing bias current to said tip and ring bilateral current gate means in response to an enabling signal from the switching system, thereby to forward bias said diodes and enable the tip and ring bilateral current gate means to couple intelligence signals therethrough;
B. an energizable on-hook power source for connection to the tip and ring conductors between said connection means and the subscriber set for energizing the subscriber line while the connected subscriber set is on-hook, said on-hook power source being de-energized in response to the receipt of a dial pulse signal;
C. a hook switch condition detector for connection to the tip and ring conductors between said connection means and the subscriber set and connected to said on-hook power source, said hook switch condition detector including means responsive to the subscriber set going off-hook for generating a dial pulse signal that de-energizes said on-hook power source; and
D. an off-hook power source for connection to the tip and ring conductors between said connection means and the switching system for energizing the subscriber line.

2. A line circuit as defined in claim 1 in which each said tip and ring bilateral current gate means comprises a diode bridge circuit, the respective tip or ring conductor being connected to the junctions at which the cathode of one diode connects to the anode of another diode, and said bias current means being connected to the junctions at which the cathodes of diodes are connected together and the anodes of diodes are connected together.

3. A line circuit as defined in claim 1 in which bias current means includes
A. switch means responsive to control signals and to clocking signals from the switching system for generating switched clocking signals in response to the coincidence of the clocking signals and the control signals; and
B. rectifier means for rectifying the switched clocking signals from the switch means and coupling the rectified signals to the tip and ring bilateral current gate means as bias current.

4. A line circuit as defined in claim 3 in which said switch means is also responsive to the coincidence of the dial pulse signal from the hook switch condition detector with the clocking signals and control signals for generating the switched clocking signals.

5. A line circuit as defined in claim 3 in which said rectifier means comprises transformer means that generates a signal in response to the switched clocking signals from the switch means and tip and ring bridge rectifier means that rectify the signal from the transformer means to generate the bias current, the tip and ring bridge rectifier means being connected to the respective tip and ring bilateral current gate means.

6. A line circuit as defined in claim 1 wherein said on-hook power source comprises first and second switch means connected to first and second voltage sources, each of the first and second switch means also being connected to one of the tip and ring conductors, the dial pulse signal being coupled to enable said first switch means to energize its connected conductor, the first switch means in turn being connected to enable the second switch means to energize its connected conductor.

7. A line circuit as defined in claim 6 wherein each of the first and second switch means comprises a transistor, the first voltage source providing a voltage of a selected polarity and the second voltage source providing a voltage of the opposite polarity, the output of the first switch means transistor being coupled to its associated conductor through a first diode polled to transfer current to the conductor, the output of the first switch means transistor further being coupled to the second switch means through a second diode polled oppositely to the first diode, said second switch means transistor being connected to its associated conductor through a third diode polled to transfer current from the conductor.

8. A line circuit as defined in claim 1 wherein said hook switch condition detector comprises comparison means connected to the tip and ring conductors for generating a dial pulse signal when the voltage difference between the conductors is below a selected level.

9. A line circuit as defined in claim 8 wherein the comparison means comprises a bridge network comprising a plurality of resistors, one junction being connected to one of the conductors and an opposing junction being connected to a reference voltage source energized to the same voltage as the one conductor when the subscriber is on-hook, a third junction being connected to another voltage source, and at the fourth junction the resistors being connected to a voltage comparator, voltages across the resistors comprising the bridge network being balanced when the subscriber is on-hook and becoming unbalanced when the subscriber goes off-hook, the comparator sensing when the bridge network is unbalanced and generating the dial pulse signal in response thereto.

10. A line circuit as defined in claim 1 wherein said line circuit is connected to the switching system through a transformer having two primary windings connected in series through a blocking capacitor so that a voltage signal is generated at the connection between each primary winding and the blocking capacitor, said off-hook power source comprising transistors connected to each of the tip and ring conductors and to associated voltage sources, the transistors being controlled by the voltage signal at the connection between the primary winding connected to its associated conductor and the blocking capacitor, whereby the primary windings and blocking capacitor of the transformer constitute a high impedance to direct current and a low impedance to alternating current comprising the intelligence signals, and the transistors constitute a low impedance to direct current and a high impedance to alternating current.

11. A line circuit for interconnecting a subscriber line having a far end connected to a subscriber set and a switching system and for coupling intelligence signals, including voice signals, therebetween in a telephony system, the subscriber line including both tip and ring conductors, the line circuit comprising:
A. connection means including:
i. tip and ring bilateral current gate means connected to said tip and ring conductors respectively for selectively coupling intelligence signals therethrough, each of said tip and ring bilateral current gate means including a plurality of diodes connected to form (a) input and output junctions that define a unidirectional current path through said bilateral current gate means and (b) balance point junctions that connect in the path of the intelligence signals; and ii. bias current means connected to the switching system and the tip and ring bilateral current gate means for providing bias current to said tip and ring bilateral current gate means in response to an enabling signal from the switching system, thereby to forward bias said diodes and enable the tip and ring bilateral current gate means to couple intelligence signals therethrough;

B. a hook switch condition detector connected to the tip and ring conductors between said connection means and the subscriber set, said hook switch condition detector including means responsive to the subscriber set going off-hook for generating an off-hook signal indicating that the subscriber set has gone off-hook; and C. a power source connected to the tip and conductors between said connection means and the subscriber set for energizing the subscriber line.

12. A line circuit as defined in claim 11 wherein both said bilateral current gate means further comprise switch means connected to said input and output junctions comprising a pair of transistors of opposite conductivity types connected to couple bias current to said diodes in response to the receipt of bias current from said bias current means.

13. A line circuit as defined in claim 12 wherein said bias current means comprises:

A. switch means responsive to control signals and to clocking signals from the switching system for generating switched clocking signals in response to the coincidence of the clocking signals and the control signals; and B. rectifier means for rectifying the switched clocking signals from the switch means and coupling the rectified signals to the tip and ring bilateral current gate means as bias current.

* * * * *